United States Patent
Marceau et al.

(10) Patent No.: US 8,015,211 B2
(45) Date of Patent: Sep. 6, 2011

(54) SECURE PEER-TO-PEER OBJECT STORAGE SYSTEM

(75) Inventors: Carla Marceau, Ithaca, NY (US); Matthew A. Stillerman, Ithaca, NY (US)

(73) Assignee: Architecture Technology Corporation, Minneapolis, MN (US)

(*) Notice: Subject to any disclaimer, the term of this patent is extended or adjusted under 35 U.S.C. 154(b) by 487 days.

(21) Appl. No.: 10/957,235

(22) Filed: Oct. 1, 2004

(65) Prior Publication Data

US 2005/0240591 A1   Oct. 27, 2005

Related U.S. Application Data

(60) Provisional application No. 60/564,057, filed on Apr. 21, 2004.

(51) Int. Cl.
*G06F 17/30* (2006.01)
*H04L 9/00* (2006.01)

(52) U.S. Cl. .................... 707/802; 707/781; 380/277

(58) Field of Classification Search ................ 707/9, 10, 707/781, 999.9, 802, 803; 380/277, 278, 380/281
See application file for complete search history.

(56) References Cited

U.S. PATENT DOCUMENTS

| | | | | |
|---|---|---|---|---|
| 5,208,853 A * | 5/1993 | Armbruster et al. | ............ | 705/56 |
| 5,436,972 A * | 7/1995 | Fischer | ........................ | 380/286 |
| 5,557,346 A * | 9/1996 | Lipner et al. | ................... | 380/286 |
| 5,557,678 A * | 9/1996 | Ganesan | ........................ | 380/282 |
| 5,623,546 A * | 4/1997 | Hardy et al. | .................. | 713/193 |
| 5,675,649 A * | 10/1997 | Brennan et al. | ............... | 380/286 |
| 5,737,419 A * | 4/1998 | Ganesan | ........................ | 713/169 |
| 5,748,735 A * | 5/1998 | Ganesan | ........................ | 713/165 |
| 5,764,772 A * | 6/1998 | Kaufman et al. | ............... | 380/30 |
| 5,815,573 A * | 9/1998 | Johnson et al. | ............... | 380/286 |
| 5,838,792 A * | 11/1998 | Ganesan | ........................ | 380/282 |
| 5,870,477 A * | 2/1999 | Sasaki et al. | .................. | 713/165 |
| 5,920,630 A * | 7/1999 | Wertheimer et al. | ......... | 380/286 |
| 6,026,163 A * | 2/2000 | Micali | ............................ | 705/80 |
| 6,052,469 A * | 4/2000 | Johnson et al. | ............... | 380/286 |
| 6,061,794 A * | 5/2000 | Angelo et al. | ..................... | 726/3 |
| 6,118,874 A * | 9/2000 | Okamoto et al. | ............. | 380/282 |
| 6,182,214 B1 * | 1/2001 | Hardjono | ........................ | 713/163 |
| 6,185,685 B1 * | 2/2001 | Morgan et al. | ................ | 713/183 |
| 6,246,768 B1 * | 6/2001 | Kim | ................................ | 380/28 |
| 6,359,986 B1 * | 3/2002 | Tatebayashi | .................. | 380/277 |
| 6,363,154 B1 * | 3/2002 | Peyravian et al. | ............ | 380/283 |
| 6,411,716 B1 * | 6/2002 | Brickell | ........................ | 380/286 |
| 6,490,680 B1 * | 12/2002 | Scheidt et al. | ................ | 713/166 |
| 6,662,299 B1 * | 12/2003 | Price, III | ....................... | 713/171 |

(Continued)

OTHER PUBLICATIONS

I yengar et al. "Design and Implementation of a Secure Distributed Data Respository", 1998, Published by Capman & Hall, pp. 123-135.*

(Continued)

*Primary Examiner* — Robert Stevens
(74) *Attorney, Agent, or Firm* — Shumaker & Sieffert, P.A.

(57) ABSTRACT

A peer-to-peer (P2P) networking system is disclosed that provides a large, persistent object repository with the ability to easily scale to significant size. Data security is provided using a distributed object data access mechanism to grant access to data objects to authorized users. Data objects stored within the object repository are provided a plurality of security options including plain text data, objects, encrypted data objects, and secure, secret sharing data objects. A data object query processing component permits users to locate requested information within the P2P networking system.

29 Claims, 12 Drawing Sheets

U.S. PATENT DOCUMENTS

| | | | | |
|---|---|---|---|---|
| 6,745,220 | B1* | 6/2004 | Hars | 708/606 |
| 7,039,186 | B2* | 5/2006 | Ezawa | 380/44 |
| 7,065,579 | B2* | 6/2006 | Traversat et al. | 709/230 |
| 7,146,009 | B2* | 12/2006 | Andivahis et al. | 380/282 |
| 7,146,501 | B2* | 12/2006 | Tanaka | 713/176 |
| 7,181,017 | B1* | 2/2007 | Nagel et al. | 380/282 |
| 7,187,772 | B2* | 3/2007 | Vora et al. | 380/277 |
| 7,216,359 | B2* | 5/2007 | Katz et al. | 726/3 |
| 7,222,231 | B2* | 5/2007 | Russell et al. | 713/165 |
| 7,299,498 | B2* | 11/2007 | Lee et al. | 726/26 |
| 7,400,732 | B2* | 7/2008 | Staddon et al. | 380/278 |
| 7,401,132 | B1* | 7/2008 | Krumel et al. | 709/220 |
| 7,509,492 | B2* | 3/2009 | Boyen et al. | 713/165 |
| 2002/0013898 | A1* | 1/2002 | Sudia et al. | 713/155 |
| 2002/0078345 | A1* | 6/2002 | Sandhu et al. | 713/155 |
| 2002/0141593 | A1* | 10/2002 | Kurn et al. | 380/286 |
| 2002/0157016 | A1* | 10/2002 | Russell et al. | 713/165 |
| 2003/0026432 | A1* | 2/2003 | Woodward | 380/278 |
| 2003/0070070 | A1* | 4/2003 | Yeager et al. | 713/157 |
| 2003/0120928 | A1* | 6/2003 | Cato et al. | 713/176 |
| 2003/0147536 | A1* | 8/2003 | Andivahis et al. | 380/277 |
| 2003/0172280 | A1* | 9/2003 | Scheidt et al. | 713/182 |
| 2003/0174840 | A1* | 9/2003 | Bogan | 380/277 |
| 2003/0182421 | A1* | 9/2003 | Faybishenko et al. | 709/224 |
| 2003/0185398 | A1* | 10/2003 | Hypponnen | 380/277 |
| 2003/0233578 | A1* | 12/2003 | Dutertre | 713/201 |
| 2004/0019640 | A1* | 1/2004 | Bartram et al. | 709/205 |
| 2004/0031038 | A1* | 2/2004 | Hugly et al. | 719/315 |
| 2004/0064693 | A1* | 4/2004 | Pabla et al. | 713/168 |
| 2004/0088369 | A1* | 5/2004 | Yeager et al. | 709/217 |
| 2004/0123104 | A1* | 6/2004 | Boyen et al. | 713/165 |
| 2004/0123143 | A1* | 6/2004 | Katz et al. | 713/201 |
| 2004/0143666 | A1* | 7/2004 | Xu et al. | 709/227 |
| 2004/0153458 | A1* | 8/2004 | Noble et al. | 707/10 |
| 2004/0181607 | A1* | 9/2004 | Xu et al. | 709/239 |
| 2004/0205242 | A1* | 10/2004 | Xu et al. | 709/245 |
| 2004/0210624 | A1* | 10/2004 | Andrzejak et al. | 709/201 |
| 2005/0108203 | A1* | 5/2005 | Tang et al. | 707/3 |
| 2005/0187946 | A1* | 8/2005 | Zhang et al. | 707/100 |
| 2006/0248333 | A1* | 11/2006 | Sandhu et al. | 713/155 |
| 2009/0010426 | A1* | 1/2009 | Redmond | 380/29 |

OTHER PUBLICATIONS

Balakrishnan, Hari, et al., "Looking Up Data in P2p Systems", Communications of the ACM, vol. 46, No. 2, Feb. 2003, pp. 43-48.*
Dabek, Frank, "A Cooperative File System", MIT, Master of Engineering in Computer Science and Engineering, Sep. 2001, pp. 1-55.*
Tang, Chunqiang, et al., "Peer-to-Peer Information Retrieval Using Self-Organizing Semantic Overlay Networks", SIGCOMM '03, Karlsruhe, Germany, Aug. 25-29, 2003, pp. 175-186.*
Risse, Thomas, et al., "Data Storage Requirements for the Service Oriented Computing", SAINT-w '03, Jan. 27-31, 2003, pp. 67-72.*
Hsiao, Hung-Chang, et al., "Tornado: A Capability-Aware Peer-to-Peer Storage Network", IPDPS '03, Apr. 22-26, 2003, pp. 1-8.*
Mislove, Alan, et al., "POST: A Secure, Resilient, Cooperative Messaging System", Proc. of the 9th Conf. on Hot Topics in Operating Systems, vol. 9, Lihue, HI, © 2003, pp. 1-6.*
Wallach, Dan S., "A Survey of Peer-to-Peer Security Issues", ISSS 2002, Tokyo, Japan, Nov. 8-10, 2002, pp. 42-57.*
Daswani, Neil, et al., "Open Problems in Data-Sharing Peer-to-Peer Systems", ICDT 2003, Siena, Italy, Jan. 8-10, 2003, pp. 1-15.*
Microsoft Computer Dictionary, 5th Edition, Microsoft Press, Redmond, WA, © 2002, p. 300.*
Seitz, Ludwig, et al., "Key Management for Encrypted Data Storage in Distributed Systems", IEEE Security in Storage Workshop, © 2003, pp. 20-30.*
Bellare, Mihir, et al., "Verifiable Partial Key Escrow", CCS 97, Zurich, Switzerland, © 1997, pp. 78-91.*
Jablon, David P., "Password Authentication Using Multiple Servers", CT-RSA 2001, LNCS 2020, Springer-Verlag, Berlin, Germany, © 2001, pp. 344-360.*
Stinson, D. R., et al., "Key Preassigned Traceability Schemes for Broadcast Encryption", SAC '98, LNCS 1556, Springer-Verlag, Berlin, Germany, © 1999, pp. 144-156.*
Wright, Charles P., et al., "NCryptfs: A Secure and Convenient Cryptographic File System", USENIX 2003 Annual Technical Conf., © 2003, pp. 1-14.*
Shamir, Adi, et al., "How to Share a Secret", Communications of the ACM, vol. 22, Issue 11, Nov. 1979, pp. 612-613.*
Waldvogel, Marcel, et al., "The VersaKey Framework: Versatile Group Key Management", IEEE Journal on Selected Areas in Communications, vol. 17, No. 9, Sep. 1999, pp. 1614-1631.*
Rafaeli, Sandro, et al., "A Survey of Key Management for Secure Group Communication", ACM Computing Surveys, vol. 35, No. 3, Sep. 2003, pp. 309-329.*
Bansal, Dushyant, "Securing Content in Peer-to-Peer File Systems", E&CE 628, Apr. 26, 2003, pp. 1-54.*
A. Shamir, "How to Share a Secret," in Communications of the ACM22 pp. 612-613, 1979.
Miguel Castro et al., "Secure Routing for Structured Peer-to-Peer Overlay Networks," in Proceedings of $5^{th}$ Usenix Symposium on Operating Systems Design and Implementation, pp. 299-314, 2002.
S. Ajmani et al., "ConChord: Cooperative SDSI Certificate Storage and Name Resolution," In Proceedings of $1^{st}$ International Workshop on Peer-to-Peer Systems (IPTPS '02), 2002, pp. 141-154.
I. Stoica et al., "Chord: A Scalable Peer-to peer Lookup Service for Internet Applications," Proceedings of ACM SIGCOMM, 2001, vol. 31 (4), pp. 149-160.
A. Rowstron et al., "Pastry: Scalable, Decentralized Object Location, and Routing for Large-Scale Peer-to-Peer Systems," Proceedings of $18^{th}$ IFIP/ACM International Conference on Distributed Systems Platforms (Middleware 2001), 2001, p. 329-eoa.
A. Iyengar et al., "Design and Implementation of a Secure Distributed Data Repository," Proceedings of $14^{th}$ IFIP International Information Security Conference (SEC 98), 1998.
M. O. Rabin, "Efficient Dispersal of Information Security, Load Balancing, and Fault Tolerance," Journal of the Association for Computing Machinery, New York, NY, 1989, vol. 36, No. 2, pp. 335-348.
A. Rowstron et al., "Storage Management and Caching in PAST, A Large-scale, Persistent Peer-to-Peer Storage Utility," Proceedings of ACM SOSP, 2001, vol. 35 (5), pp. 188-201.
M. Blaze et al., "Decentralized Trust Management," Proceedings of IEEE Symposium on Security and Privacy, 1996, pp. 164-173.
A. Muthitacharoen et al., "Ivy: a Read/Write Peer-to-Peer File System," Proceedings of $5^{th}$ Symposium on Operation Systems Design and Implementation, 2002, vol. 36 (sl), pp. 31-44.
R. Mahajan et al., "Controlling the Cost of Reliability in Peer-to-Peer Overlays," Proceedings of the $2^{nd}$ International Workshop on Peer-to-Peer Systems, (IPTPS '03), Berkley, CA, 2003.
M. Castro et al., "One Ring to Rule them All: Service Discovery and Binding in Structured Peer-to-Peer Overlay Networks," Proceedings of the SIGOPS European Workshop, Saint-Emilion, France, 2002.
M. Castro et al., "Proximity Neighbor Selection in Tree-Based Structured Peer-to-Peer Overlays," Technical Report MSR-TR-2003-52, www.research.microsoft.com, Sep. 2003.
M. Castro et al., "Topology-aware routing in structured peer-to-peer overlay networks," International Workshop on Future Direction in Distributed Computing (FUD. Co), Bertinoro, Italy, Jun. 2002.
A. Adya et al., "FARSITE: Federated, Available, and Reliable Storage for an Incompletely Trusted Environment", $5^{th}$ OSDI, Dec. 2002. http//citeseer.ist.psu.edu/adya02farsite.html.
P. Druschel et al., "PAST: A large-scale, persistent peer-to-peer storage utility," Proc. of HOTOS Conf., Schoss Elmau, Germany, May 2001.
G.R. Blakley, "Safeguarding Cryptographic Keys," Proceedings of the National Computer Conference, 1979, pp. 313-317.

* cited by examiner

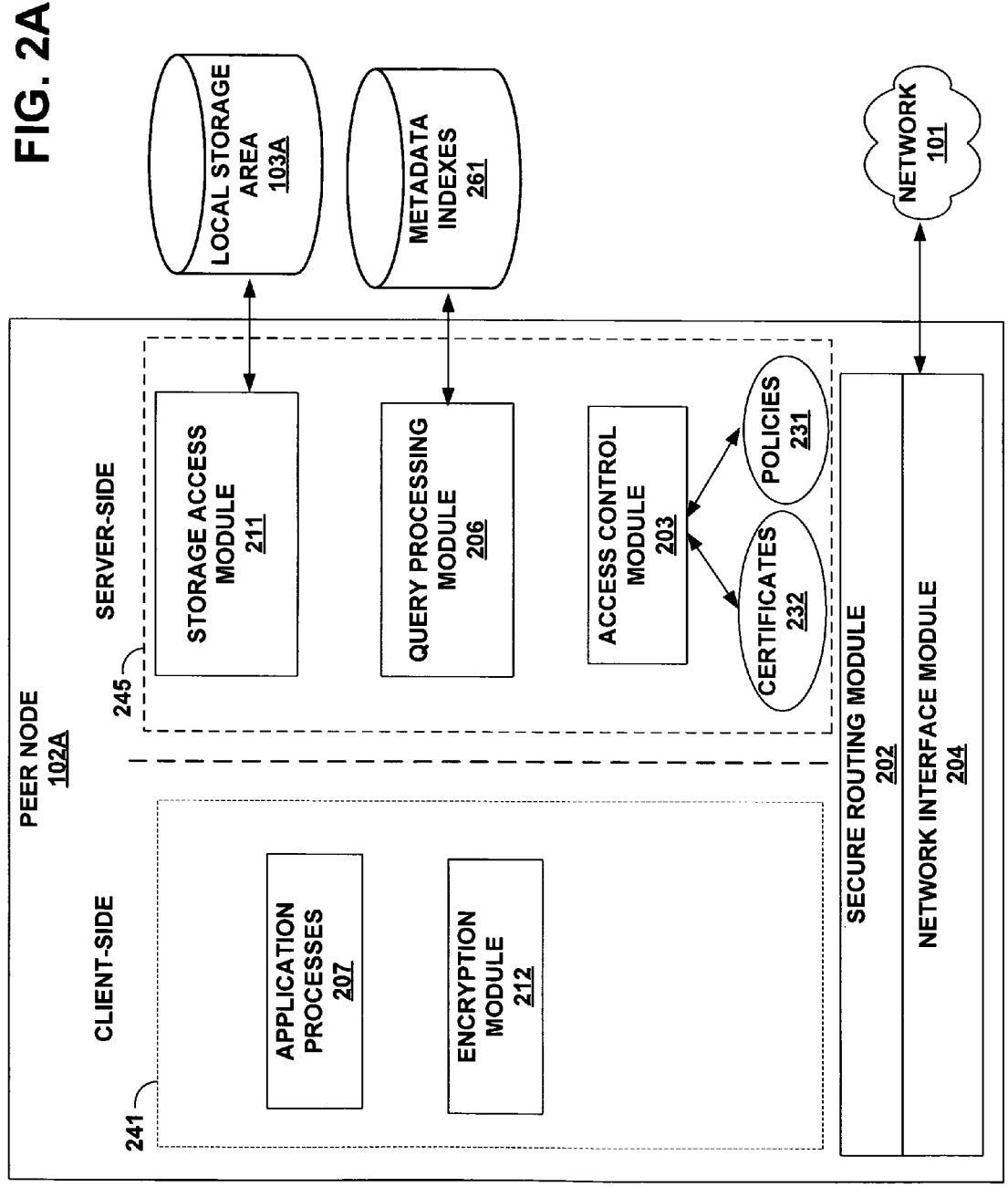

SECURE PEER-TO-PEER OBJECT STORAGE SYSTEM

RELATED PATENTS

This application claims the benefit of U.S. Provisional Application to Marceau et al., entitled, "SECURE ACCESS CONTROL IN A PEER-TO-PEER OBJECT STORAGE SYSTEM USING UNTRUSTED COMPONENTS," Ser. No. 60/564,057, filed Apr. 21, 2004, the content of which is incorporated herein by reference in its entirety.

STATEMENT REGARDING FEDERALLY SPONSORED RESEARCH OR DEVELOPMENT

This invention was made with Government support under Contract F30602-03-C-0041 awarded by the U.S. Air Force. The Government may have certain rights in this invention.

TECHNICAL FIELD

The invention relates to distributed data storage systems, and more specifically, to providing secure access to data object storage within peer-to-peer networks.

BACKGROUND

Peer-to-peer (P2P) technology presents an alternative to traditional centralized information systems because of their potential to scale to realistic sizes and their inherent fault-tolerance. In P2P systems, computers communicate directly with each other, rather than through servers that can become performance bottlenecks and single points of failure. Self-organizing P2P networks have proven highly adaptable to changes in network connectivity and resilient to node or network failures. While current P2P technology may provide scalable and robust distributed data object storage, current P2P solutions are not widely used due, at least in part, to security concerns. For example, P2P networks are generally used for freely sharing data, such as information or music. However, P2P networks generally do not provide needed security and access control with query functionality that is required for more sophisticated information systems.

SUMMARY

In general, the invention relates to peer-to-peer (P2P) computer networks used to provide secure data storage and data object retrieval between peer nodes within a peer-to-peer network. For example, as described herein, the invention provides secure access control and integrated query functionality to easily identify and retrieve the data objects. As another example, the invention provides mechanisms for secure storage of objects at even insecure peers within the P2P system.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 2A and 2B are block diagrams illustrating an exemplary embodiments of peer nodes within the P2P data storage system of FIG. 1A.

DETAILED DESCRIPTION

Figure 1A:
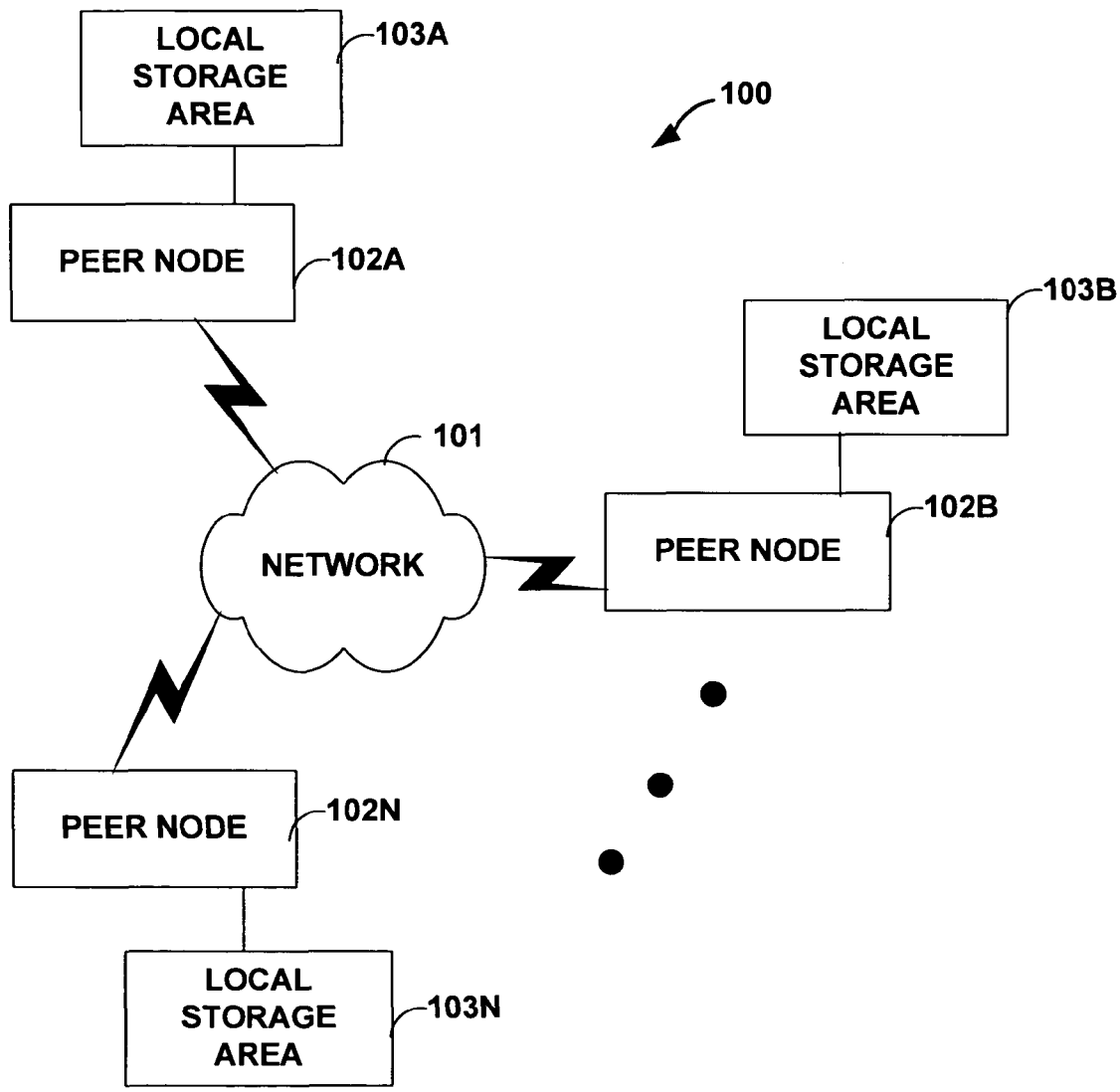
FIG. 1A is a block diagram illustrating a peer-to-peer (P2P) data storage system according to the present invention.

FIG. 1A is a block diagram illustrating an example peer-to-peer (P2P) data storage system 100 according to the present invention. A plurality of peer nodes 102A-102F (collectively, "peer nodes 102") are connected to a common communications network 101 to create P2P data storage system 100. Local storage areas 103A, 103B and 103N (collectively, "local storage areas 103") are coupled to respective peer nodes 102A, 102B and 102N (collectively, "peer nodes 102").

In general, local storage areas 103 store data objects that may be accessed by software processes executing within any of peer nodes 102. The software processes may be controlled and initiated by principals, i.e., users, who use P2P data storage system 100 to perform data processing tasks. In particular, access requests on behalf of the principals are transmitted between peer nodes 102 to store, retrieve and delete data objects stored within local storage areas 103. Each of the peer nodes 102 applies policies to control the application of the access requests, i.e., whether to accept or reject the access requests. As described herein, this process is performed in a secure manner without use of a centralized network node that maintains control access information.

P2P data storage system 100 is constructed as an overlay network that operates within a distributed computing system connected via communications network 101. For example, network 101 may consist of an Internet Protocol (IP)-based network in which peer nodes 102 exchange data packets or cells using any number of communications protocols, including the transmission control protocol (TCP) or other protocols. Peer nodes 102 maintain P2P routing tables that include network addresses, such as IP addresses, for other peer nodes 102 for use in the exchange of data packets between the various peer nodes.

Fundamentally, P2P data storage system 100 operates on two levels. At a base level, P2P data storage system 100 provides secure object storage for distributed data objects. At this level, P2P data storage system 100 provides insert, lookup, and reclaim capability on individual objects. P2P data storage system 100 makes no assumptions about the objects being stored. At a higher level, P2P data storage system 100 provides retrieval mechanism for location and retrieval of information stored within the data objects. For example, objects may consist of metadata and payload, and P2P data storage system 100 supports query mechanisms to locate objects using the stored metadata.

In accordance with the principles described herein, P2P data storage system 100 provides integrity, availability, and confidentiality for data objects stored within local storage areas 103 in spite of malicious or insecure nodes. In other words, in the event a node is compromised, the malicious acts that can be carried out by the node are limited. For example, the node can alter or destroy the data objects that it stores (threat to integrity); refuse to grant access to authorized principals (threat to availability); grant access to unauthorized principals, such as itself (threat to confidentiality); and examine information objects in transit from a source to a destination node. Nevertheless, the integrity, availability, and confidentiality of data objects throughout P2P data storage system 100 are not compromised.

For example, integrity is ensured by use of self-certifying data objects. In other words, data objects are stored in a manner that allows their authenticity to be easily verified by the recipient. As described below, in one embodiment each data object is associated with an identifier that is a secure hash of its contents, signed by its creator. Therefore, the recipient of a data object can always check its integrity.

Availability is ensured by replication of data objects within multiple network peer nodes 102. If peer node 102A, for example, receives a corrupted data object in response to a query, or its request for an object is denied by a malicious node, peer node 102A may request the data object from one or more different nodes. However, the probability that all peers holding replicas of a given object are compromised is $(b/N)^r$, where N is the total number of nodes, b is the number of corrupt nodes, and r is the replication factor. For example, replicas of a data object may be stored at the r nodes whose addresses are closest to the ID of the data object. The parameter r is referred to as a replication factor, and determines a degree of fault-tolerance provided by P2P data storage system 100. As one example, P2P data storage system 100 may have b=5, N=500, r=5, for which the probability of all peers holding a given data object being compromised equals $10^{-10}$, which is negligible.

In addition, P2P data storage system 100 provides "secure routing" that allows client 102A, for example, to require that a requested data object travel across network 100 by a different route than previously requested. In this manner, malicious nodes are not able to prevent correct delivery of data objects within P2P data storage system 100. Secure routing ensures that a particular message is eventually delivered, despite the fact that one or more peer nodes 102 may be corrupt, or may drop or misroute the message. Secure routing also ensures that a particular message is delivered to any of peer nodes 102 storing a replica of a given data object.

P2P data storage system 100 provides confidentiality of the contents of the data objects with use of encryption. Many well-known encryption mechanisms may be used to provide a desired level of protection for the data objects. As described herein, encryption keys themselves are stored as "secure data objects." Moreover, each data object may be divided into multiple components and distributed to different peer nodes 102. In particular, each of these components may be stored as a separate data object in separate peer node 102 in P2P data storage system 100. Because of this a malicious node needs to gain access to all of these separate data objects in order to construct the encryption key used to decrypt an encrypted data objects.

In general, P2P data storage system 100 implements these secure access control mechanisms on top of a P2P infrastructure that provides a name space for objects and peers, file storage, and peer-to-peer message routing. For example, in one exemplary embodiment, P2P data storage system 100 utilizes "FreePastry," which is open-source code P2P network technology that is freely available from Rice University. Other versions are available from Microsoft Corporation. In general, pastry provides efficient message routing among large numbers of nodes within a P2P network.

Figure 1B:
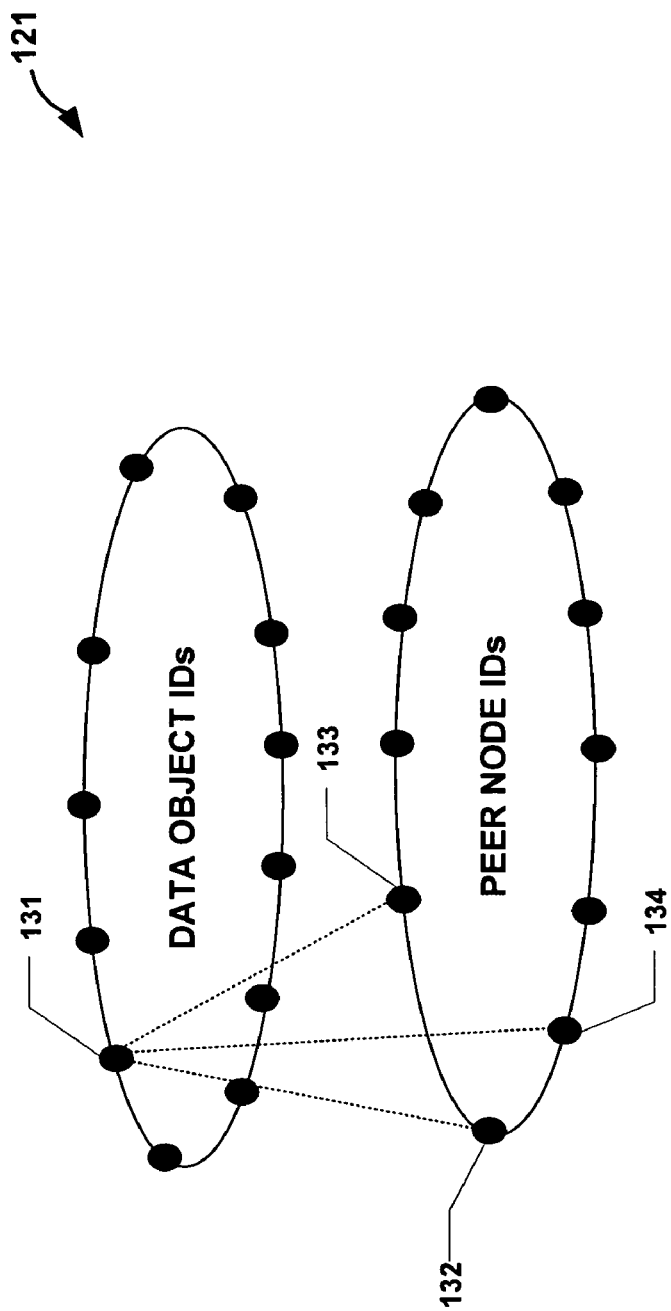
FIG. 1B is a block diagram illustrating a mapping of data object identifiers to peer node identifiers within a data object storage address space in the P2P data storage system of FIG. 1A.

FIG. 1B is a block diagram illustrating an example data object address space implemented via P2P data storage system. In particular, FIG. 1B illustrates an exemplary data object address space 122, such as an address space provided by Pastry, in which data object identifiers are mapped to peer node identifiers.

In the illustrated example of FIG. 1B, each peer node 102 (FIG. 1) has an associated identifier (ID), which may an integer selected randomly between 0 and $2^{128}-1$. Consequently, the address space may be viewed as a ring. P2P data storage system 100 locates target nodes in a series of node-to-node hops without using any centralized or global view of the entire network. In general, the number of hops required to send a message between two nodes is roughly log N, where N is the number of nodes.

The address space serves a double purpose in P2P data storage system 100. First, the address space provides a unique ID for each object and peer node 102. Second, the address space provides a mechanism, such as a distributed hash table (DHT), that can be used to locate one or more peer nodes 102 responsible for a given object ID. For example, data object 131 may be stored on peer node 132, peer node 133 and peer node 134 to provide a desired level of replication.

In an exemplary embodiment, a peer node 102 (FIG. 1) is assigned an ID within the data object address space 122. Data objects are stored at the peer nodes having IDs that are "closest" to the object's object ID. When a particular data object is replicated at r different peer nodes, the particular data object is stored in all peer nodes in which assigned node IDs are one of the "r closest" node IDs for all peer nodes present in the data object address space 122. Peer nodes 102 typically are informed of node IDs for a set of neighboring peer nodes having assigned node IDs closest to each peer node. Using the information identifying the set of neighboring peer nodes and their respective node IDs, peer node 102 may determine if its assigned node ID is one of the "r closest" peer nodes in data object address space 122 for any requested data object.

FIG. 2A is a block diagram illustrating an example embodiment of a peer node, such as peer node 102A of P2P data storage system 100. In this example embodiment, peer node 102A contains a plurality of data processing modules to perform data object storage and retrieval functions within P2P data storage system 100. These processing modules are organized into two separate sets of functions: (1) client-side request processing modules 241, and (2) server-side modules 245.

Network interface module 204 provides a P2P infrastructure and general interface between network 101 and peer node 102A. Network interface module 204, for example, translates data access requests and corresponding responses into individual data packets for transmission over network 101, as well as assembles incoming data access requests and corresponding responses received from other peer nodes 102.

Secure routing module 202 provides secure routing of data objects between peer nodes 102. Secure routing module 202 ensures that a message is delivered to an authorized one of peer node 102 that it is addressed to and that the requested data object is uncompromised. Secure routing module 202 also ensures that the one of peer nodes 102 receiving the message can trust that the identity specified within the message is accurate. Because secure routing ensures these properties, principals receiving and using data objects stored within P2P data storage system 100 may confidently know that unaltered data objects are provided from trusted peer nodes 102 in response to data storage and data retrieval requests. In one embodiment, secure routing module 202 utilizes the secure routing techniques described by M. Castro, P. Drushel, A. Ganesh, A. Rowstron, and D. Wallach, "Secure routing for structured peer-to-peer overlay networks," OSDI '02, Boston, Mass., 2002, hereby incorporated by reference.

Client modules 241 are a set of processing modules invoked by a principal to store and retrieve data objects from P2P data storage system 100. In the illustrated example, client modules 241 include application processes 207 that generally represent client-side application software that utilizes P2P data storage system 100 to store and retrieve data objects.

Application processes 207 may store data objects within P2P data storage system 100 in plain text form. Alternatively, application processes 207 may invoke encryption module 212 to provide a higher level of security and store the data objects within P2P data storage system 100 in encrypted form.

In practice, when initiating a data access request to store a data object within a different peer node 102, encryption module 212 utilizes a randomly generated encryption key to encrypt the data object before the data object is transmitted across network 101. As a result, an unencrypted version, e.g., a plain text version, of the data object exists only within one of peer nodes 102 that initiates the storage or retrieval data access request.

In order to securely support query functionality, i.e., the ability for a peer node 102 to identify and retrieve a data object without prior knowledge of the specific data object, encryption module 212 supports a technique referred to herein as "secret sharing." As described in further detail below in reference to FIG. 6A, encryption module 212 randomly generates a set of bit sequences for reconstructing the encryption key. Encryption module 212 stores the bit sequences as separate data objects within P2P data storage network 100. When retrieving an encrypted data object, encryption module 212 retrieves the bits sequences, and reconstructs the key and decrypts the data object. In this manner, the bit sequences are referred to herein as the "secret shares" for an associated data object; these secret shares are stored and must be combined to reconstitute the encryption key. Because the secret shares are stored independently on different peer nodes 102, it essentially impossible for a single malicious node acting alone to reconstitute the key.

In general, server-side modules 245 support two operations on objects: (1) object retrieval, and (2) object storage. For both operations, access control module 203 provides access control decisions associated with data object access requests and metadata index queries. When one of peer nodes 102 issues a query to determine locations for data objects or attempts to store or retrieve data objects, access control module 203 determines whether the one of peer nodes 102 transmitting the data access request is authorized to perform the data object access. Specifically, access control module 203 compares certificates provided by the requesting one peer node 102 with certificates 232 to verify the principal's claim that it is authorized to perform the requested operation. Once access control module 203 grants access to local storage area 103A, the data object access request is processed within peer node 102A.

In this manner, policies 231 may be used to establish the access rights for each data object. If the set of provided peer node certificates, together with the policy and the requested data object metadata, enables peer node 102A to complete a proof that supports the request, then peer node 102A grants the data access request. In the case of data object storage, access control module 203 checks that a principal requesting the storage is listed as the publisher in the object's metadata, and that the digest is consistent with the data object's contents.

Storage access module 211 provides a programming interface between peer node 102A and local storage area 103A. For example, storage access module 211 accesses local storage area 103A to store or retrieve data objects in response to requests from client modules 241 on any peer node 102 in P2P data storage system 100 once access control module 203 has granted permission for the requested access.

Query processing module 206 and metadata indexes 261 identify data objects in response to queries made against metadata associated with the data objects, thereby allowing data objects to be identified for retrieval. Query processing module 206 receives data object query requests from network interface module 204 that are sent by any "client," i.e., client-side modules 241 executing on any peer node 102 in P2P data storage system 100. In other words, client-side modules 241 issue queries to identify data objects within system 100 having metadata satisfying certain metadata constraints. P2P data storage system 100 maintains a metadata index 261 for each type of data objects, and each metadata index may be replicated on two or more peer nodes 102. As a result, the metadata indexes permit query processing module 206 to efficiently identify data objects having metadata entries that satisfy a particular query request.

Figure 2B:
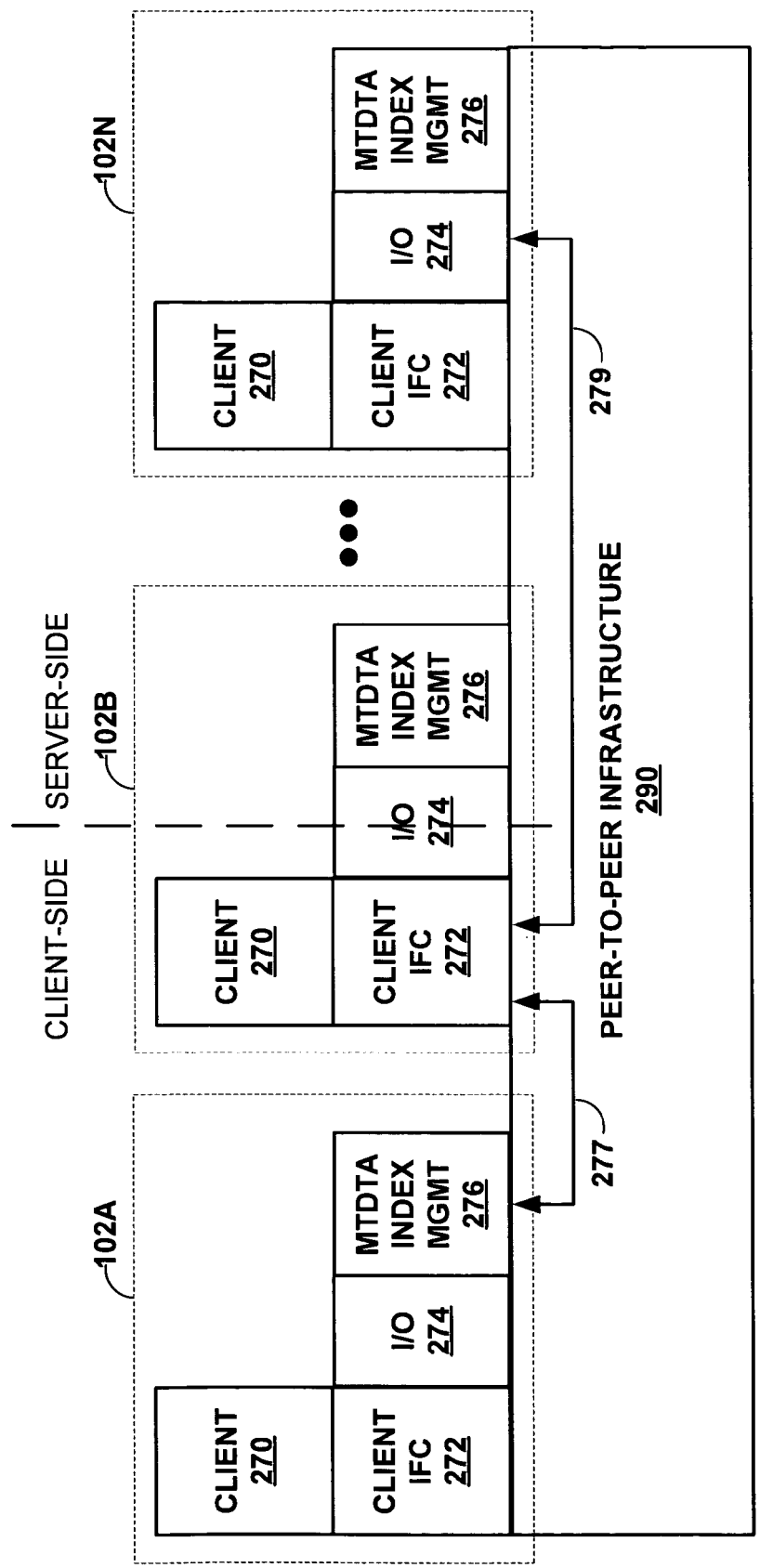

FIG. 2B is a block diagram illustrating another exemplary embodiment of peer nodes 102. In particular, FIG. 2B illustrates three peer nodes 102A, 102B and 102N. Each peer node 102 may generally be viewed as including client modules 270 (e.g., software applications) that invoke client interface 272. In turn, client interface (CLIENT IFC 272 in FIG. 2B) provides an interface to the functionality described herein. Collectively, client modules 270 and client interface 272 are viewed as a "client" of P2P data storage system 100.

As shown in FIG. 2B with respect to peer node 102B, each peer node exhibits both "client-side" and "server-side" functionality. Moreover, each peer node 102 accepts client requests and forwards them to the appropriate node for service. For example, to respond to an access query, client-side modules of peer node 102B issues a request 277 to server-side modules of peer node 102A, which holds the metadata index for the requested type in order to the get the data object identifiers of the requested data objects. Peer node 102B then issues request 239 to retrieve the data objects from peer node 102N.

In general, a store operation proceeds in similar manner. For example, a first communication is used to store the metadata in one or more metadata indexes, while a second communication is used to store the object at one or more nodes. Although not illustrated in FIG. 2B, encryption and decryption are performed on the "client-side" of peer nodes 102. Sensitive objects are encrypted prior to being stored.

Figure 3A:
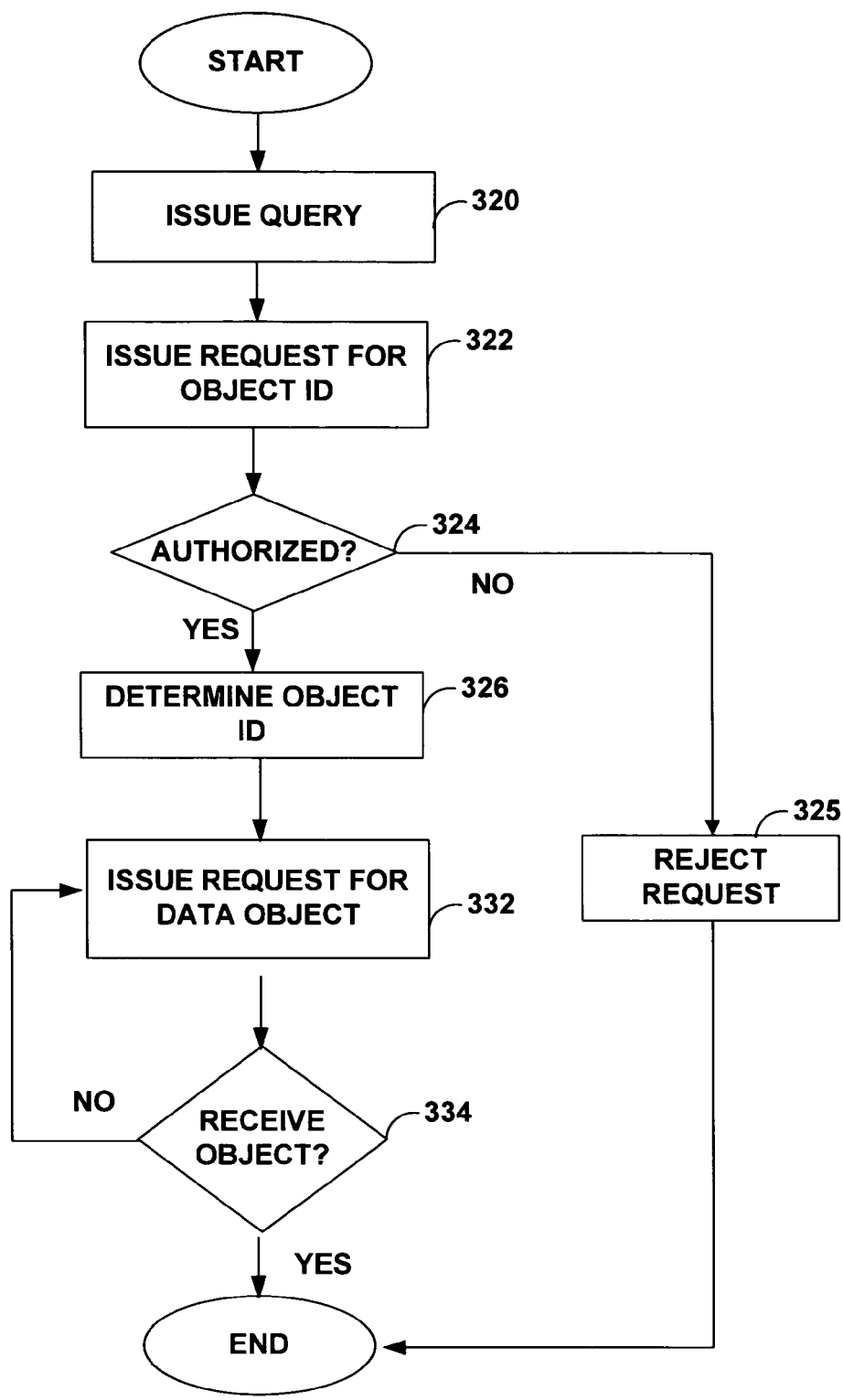
FIGS. 3A-3B are flowcharts illustrating example operation of the P2P clients when processing the remote data access requests.
Figure 3B:
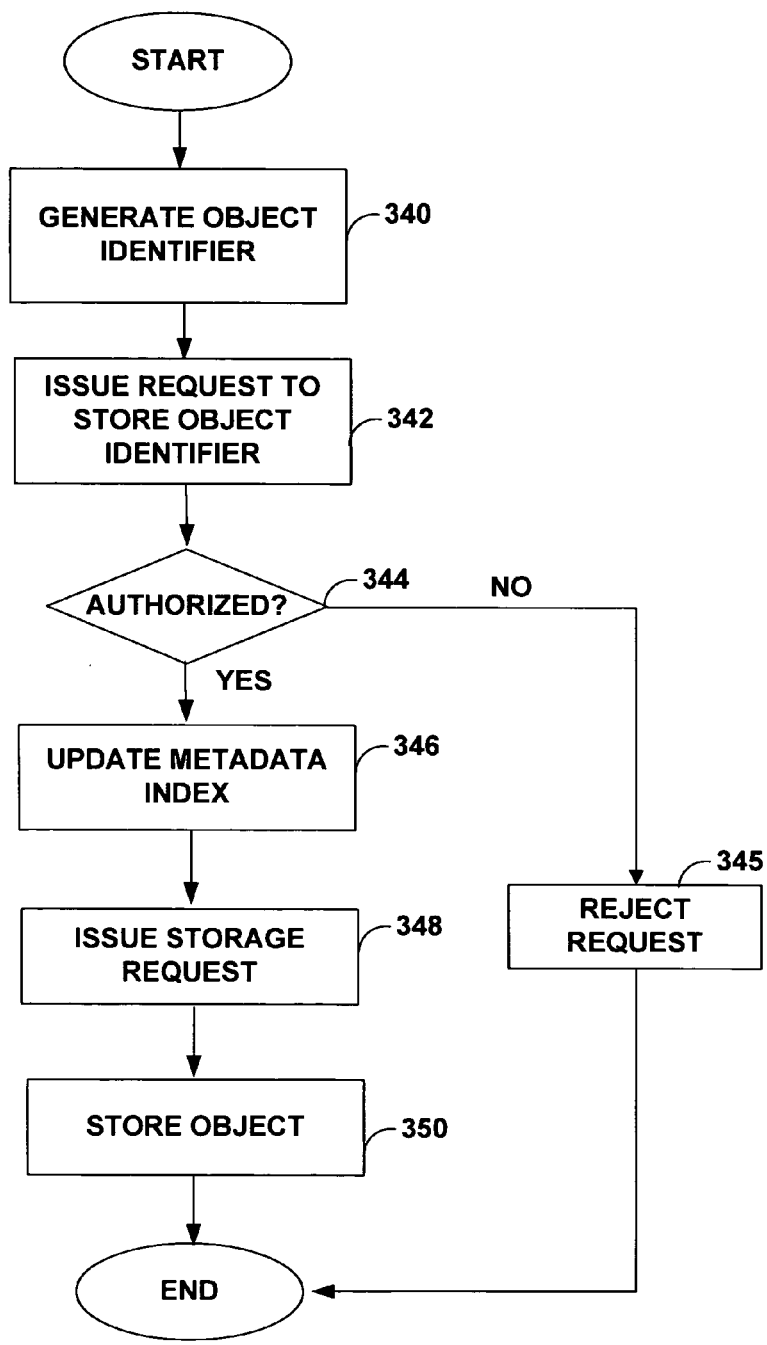

FIG. 3A-3B are flowcharts illustrating in further detail the operations involved in processing remote data access requests of data objects within P2P data storage system 100. FIG. 3A, for example, is a flowchart that further illustrates the data object retrieval operation shown in FIG. 2B.

The data object retrieval operation typically begins with software modules executing on peer node 102B, e.g., client modules 272, issuing a query. The query may, for example, take the form of a SQL database query (320). In response, peer node 102B determines the type of data object requested, and issues request 277 for the corresponding object ID for the desired data object (322). A node storing the metadata index for the requested type, such as peer node 102A, receives the requests and may reject the request if the principal associated with peer node 102B is not authorized to retrieve the type of data object (324, 325).

If the requesting principal is authorized, peer node 102A determines the object ID and returns the object ID to 102B (326). Peer node 102B then issues request 279 to peer node 102N to retrieve the desired object (332). Peer node 102B may not successfully receive the requested the data object for several reasons. As one example, peer node 102B may receive a response, but may determine that the integrity of the returned data object has been compromised. Other reasons include message routing errors, network faults, data integrity issues, or other reasons.

In the event peer node 102B does not successfully receive a response carrying the requested the data object, peer node 102B may attempt to retrieve a replica of the data object from another peer node known to contain a copy of desired data object (332). When peer node 102B is satisfied that the data object was successfully received (334), the data object retrieval operation ends. Peer node 102B now possesses the data object for subsequent use.

FIG. 3B is a flowchart illustrating a data object storage request operation in which a peer node issues a request to store a data object, e.g., by issuing a data object insert operation or a data object publish operation. Again, for exemplary purposes, the flowchart is described in reference to FIG. 2B.

Peer node 102B, for example, begins the storage operation by generating an object ID corresponding to a data object (341). For example, peer node 102B may generate the object ID by applying a hash function to the content of the data object to generate an address within the data repository address space of P2P data storage system 100. This object ID corresponds to a unique identifier for the data object, and is used to locate peer nodes storing data objects having that particular object ID.

Once the object ID corresponding to the data object is known, peer node 102B issues a storage request 277 to one or more nodes (e.g., peer node 102A) that store a metadata index for the type of data object to be stored (342). In response, peer node 102A determines whether the requesting principal is authorized to store data objects of the specified type (344). In not, peer node 102A rejects the request (345). Peer node 102A may also verify the metadata contained within the data object. For example, the metadata may contain author information regarding the creator of the data object. Peer node 102A may verify this author information to determine whether the actual author of the data object is indeed requesting the storage operation.

If the principal is authorized, peer node 102A updates the locally maintained metadata index for the object type for use in subsequent identification and retrieval of the data object (346). Next, peer node 102B determines the identity of one or more peer nodes to store the data object itself (or replicas thereof), and transmits a respective request 279 to each of the peer nodes. In response, the receiving peer nodes, such as peer node 102N, store the replicas of the data object within their local storage (350). As a result, each of these peer nodes obtain a copy of the data object to provide a desired level of data redundancy for the data object. As part of the storage operations for the data object, each of the receiving peer nodes 102 may verify the contents and metadata for the data object to check for data integrity. This verification process may include computation of an object ID from the contents of the data object to determine if its contents have been altered.

Figure 4:
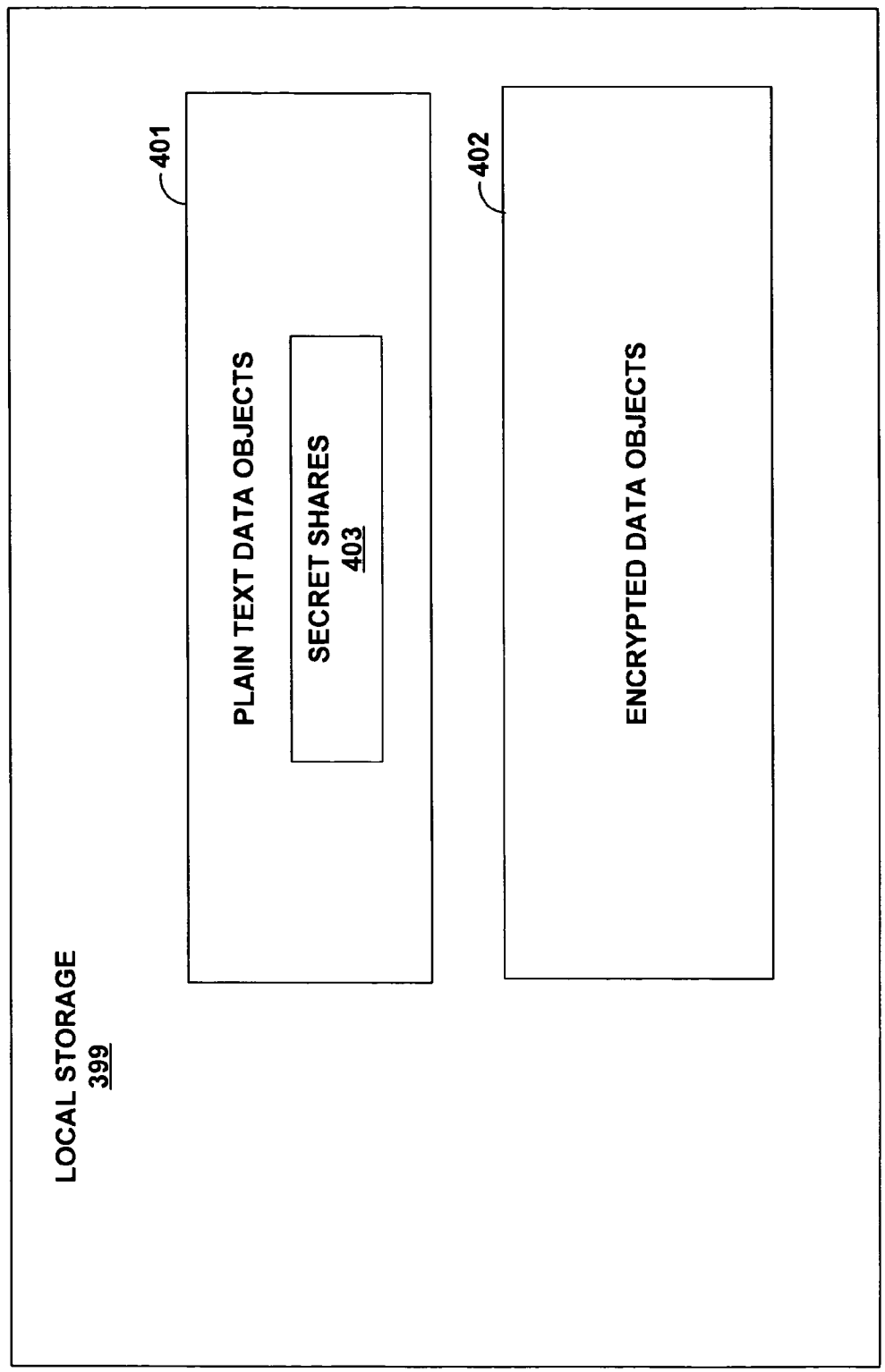
FIG. 4 is a block diagram illustrating an exemplary data object repository maintained by each node of the P2P data storage system.

FIG. 4 is a block diagram illustrating an exemplary local storage 399 of a peer node in which the local storage stores a plurality of data object types according to the present invention. In the illustrated example, local storage 399 stores two types of data objects: (1) plain text data objects 401, and (2) encrypted data objects 402. Both plain text data objects 401 and encrypted data objects 402 contain a copy of metadata used to describe the contents, author and related information useful in identifying data objects.

Plain text data object 401 corresponds to a data object in which its data is stored in plain text, i.e. non-encrypted, form. Consequently, plain text data objects 401 are typically used to store data considered to be routine or not important should peer node 102A be compromised. If an untrusted process gains access to local storage 399, and thus may access plain text data object 401, the contents of these non-secure data objects may be read.

In contrast, another form of data object that may be stored within local storage 399 is illustrated by encrypted data object 402. Encrypted data object 402 contains data stored in an encrypted form to prevent access and use of data within data item 402 should it be accessed by an unauthorized process. Encryption keys used to encrypt and decrypt encrypted data object 402 are stored in multiple shares in other peer nodes 102 to prevent unauthorized decryption and access to contents of encrypted data object 402 if local storage 399 is compromised. Encrypted data object 402 is typically used to store more sensitive data that needs additional protection from unauthorized access. Encrypted data object 402 is typically used for a subset of all data items within local storage 399 as computational overhead is needed to encrypt and decrypt the contents of encrypted data object 402 each time data item 402 is accessed. In determining if data is stored in plain text data object 401 or encrypted data object 402, the computational overhead associated with the encryption/decryption processing is compared to the need to protect the contents of the data item from unauthorized access.

One form of plain text data object is secret shares 403. As described herein, peer nodes 102 support "secret sharing" of randomly generated bit sequences for use in reconstructing encryption keys used in generating encrypted data objects 402. The bit sequences for an associated data object are stored independently in plain text form on different peer nodes 102 and are protected by access control.

Figure 5:
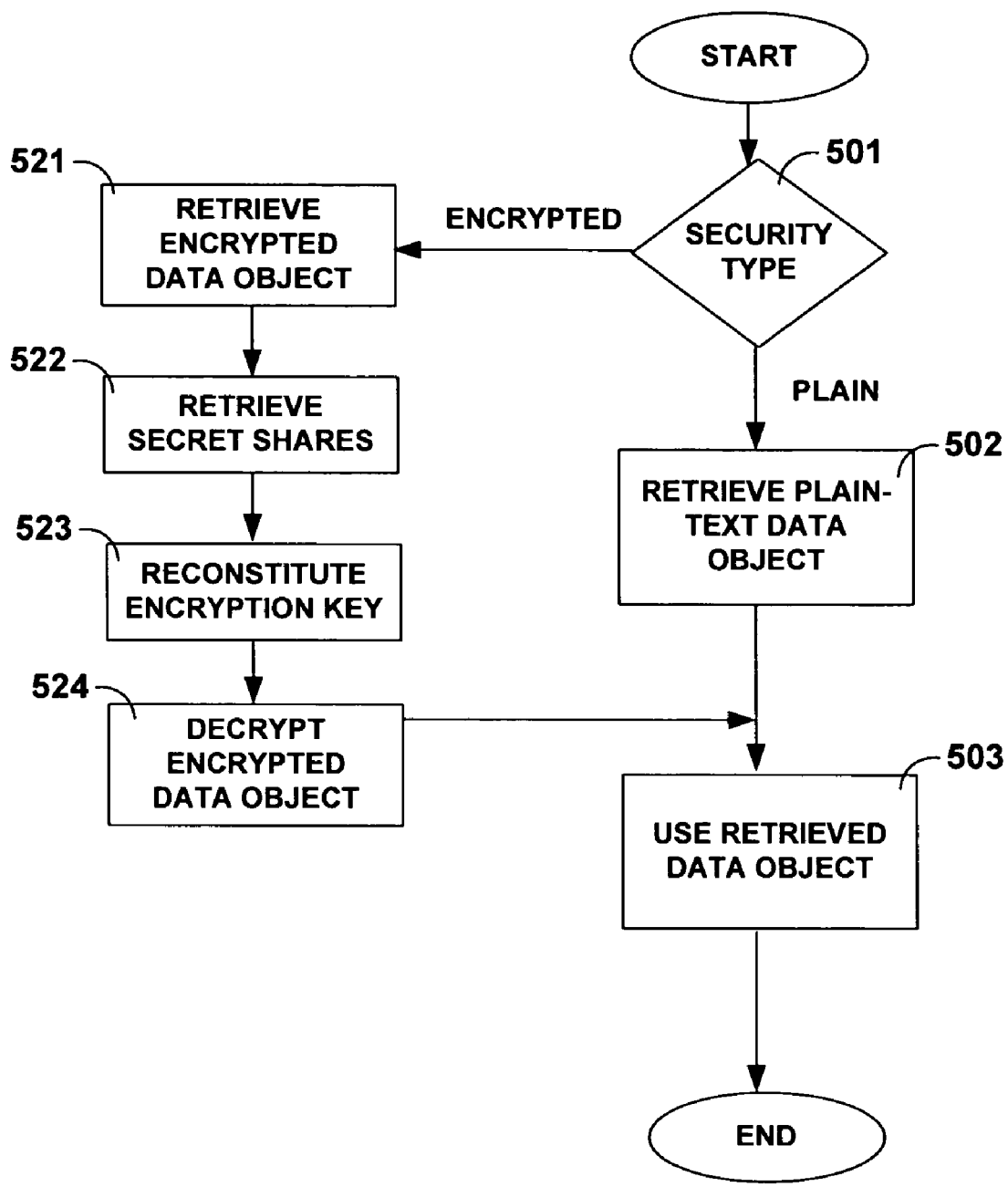
FIG. 5 is a flowchart illustrating exemplary data object retrieval operations by the P2P node according to the present invention.

FIG. 5 is a flow chart illustrating data object retrieval operations within distributed data storage network 100 in accordance with the data object types described in FIG. 4. In order to perform a data object retrieval operation for a data object having a known object ID, a peer node, such as peer node 102B, first determines the data object type for the desired data object (501). Depending upon whether a requested data object is a plain text data object 401 or an encrypted data object 402, peer node 102B performs a different set of data object retrieval operations.

For example, if the requested data object corresponds to a plain text data object 401, peer node 102A retrieves the data object as described above in reference to FIG. 3A (502). Once the requested data object is received, peer node 102A may use the requested data object (503).

If the requested data object corresponds to an encrypted data object 402, peer node 102A performs a query and retrieves the encrypted data object 402 in similar manner (521). In addition, peer node 102A performs queries to retrieve the independent secret shares 403 needed to reconstruct the encryption key associated with the retrieved encrypted data object 402 (522). After retrieving the corresponding secret shares 403, which are stored as independent data objects, peer node 102A reconstructs the encryption key and decrypts the data object (523, 524). Using this arrangement, a decrypted version of encrypted data object 402 and a complete version of the encryption key are never transmitted across the network in a plain text form.

Figure 6A:
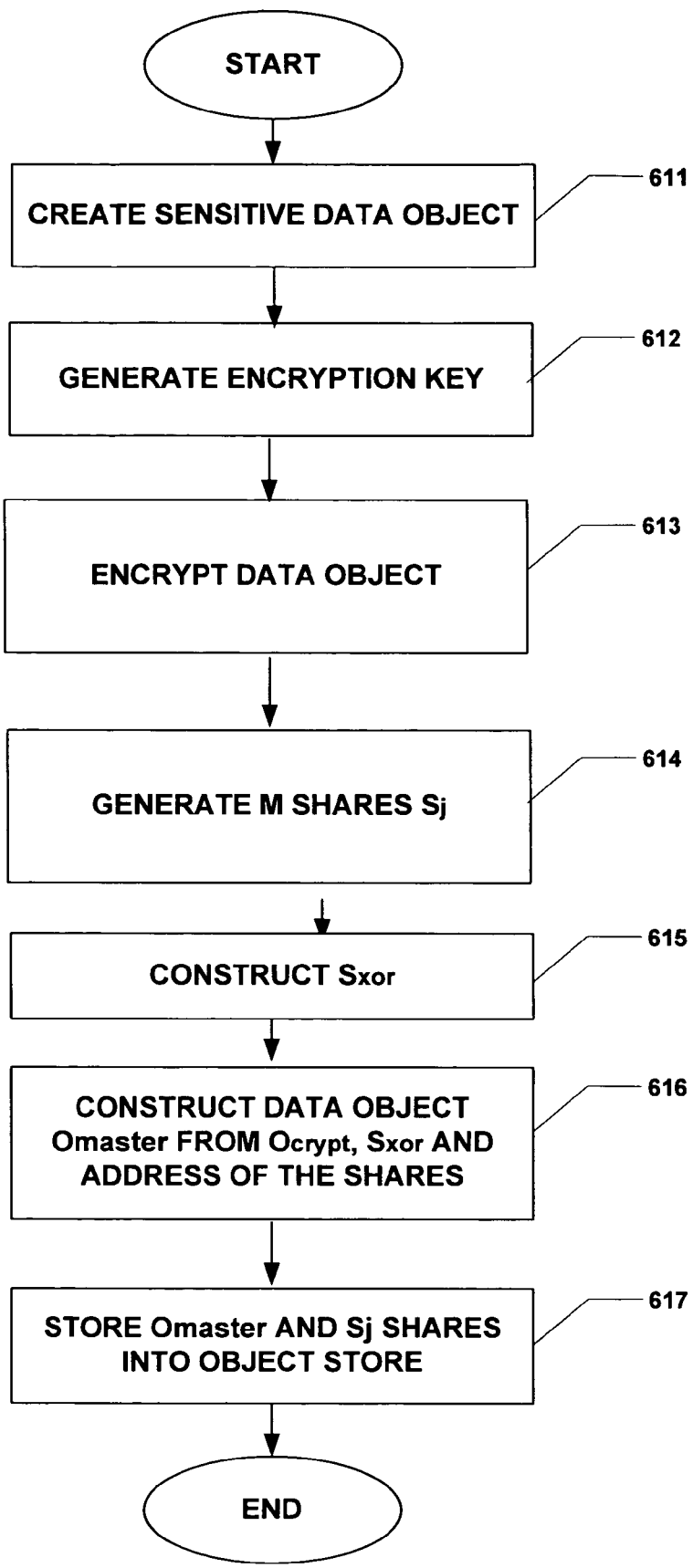
FIGS. 6A-6B are flowcharts illustrating techniques for the encryption and decryption of data objects within the P2P data storage system.
Figure 6B:
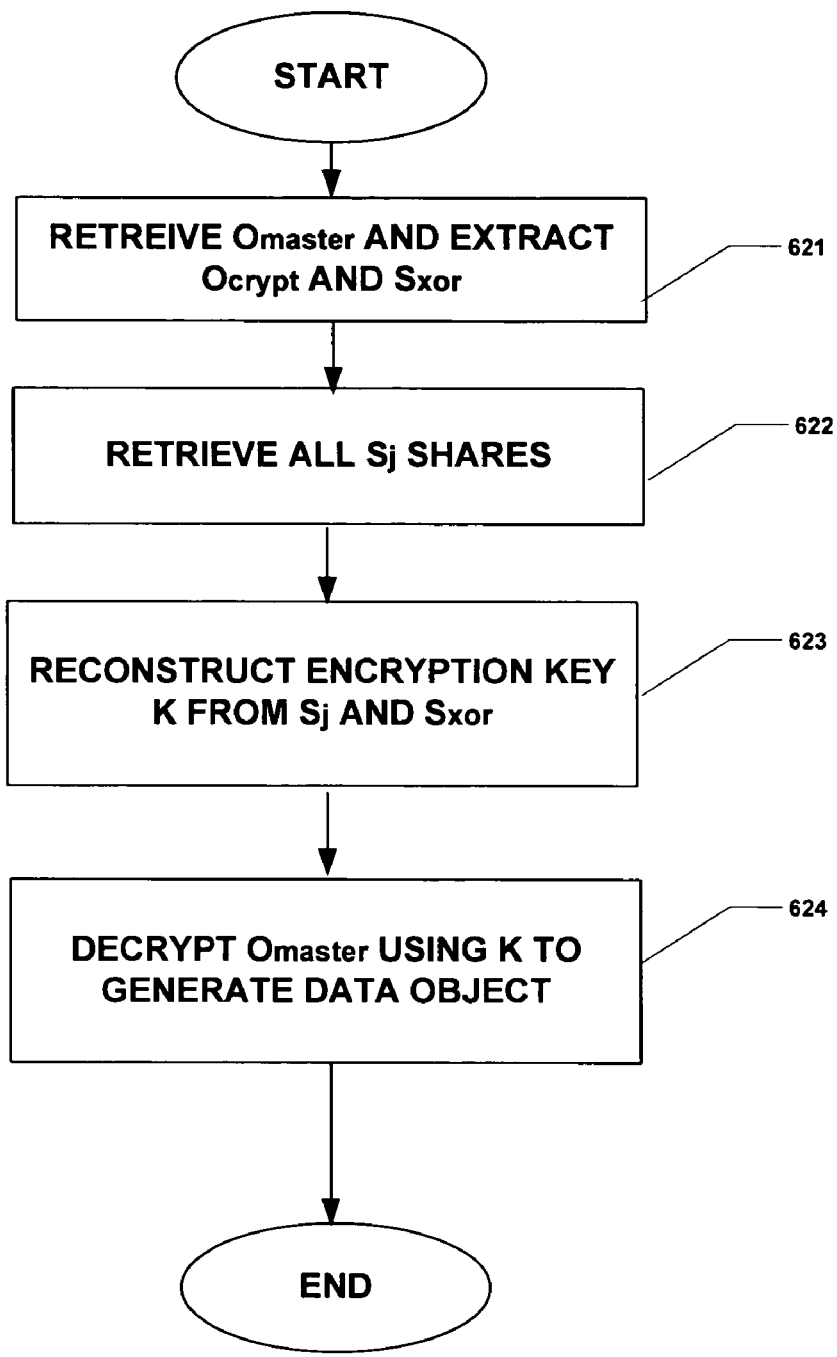

FIGS. 6A-6B are flowcharts illustrating in further detail an example process of encrypting and decrypting of data objects using secret shares within distributed data storage system 100. FIG. 6A, for example, illustrates an example client-side process for the encryption of a data object. For purposes of illustration, FIGS. 6A-6B will be discussed in reference to FIG. 2A.

Initially, a peer node 102, such as peer node 102B, creates a sensitive data object O (611). Next, peer node 102 invokes encryption module 212 to randomly generate an encryption key K (612). Next, encryption module 212 encrypts the data object using the key K (613), thereby producing an intermediate encrypted data object, $O_{crypt}$. Peer node 102B next generates M shares $S_j$, each of which is a random bit sequence the same size as K (614). Peer node 102B then constructs $S_{XOR}$, by performing the exclusive-or (XOR) of key K with the M random bit sequences (615). $S_{XOR}$ may be viewed as an intermediate bit sequence that can be used to reconstitute the encryption key, provided the shares $S_j$ are known.

Peer node constructs a data object $O_{master}$ containing $O_{crypt}$, $S_{XOR}$, and the addresses of each of the secret share data objects 403 (616). As discussed above, the address of each of the secret share data objects 403 is computed by a hashing algorithm on the contents of the respective objects. Once completed, peer node 102B stores $O_{master}$ and the bit sequences $S_j$ within P2P data storage system 100 as data objects. The master object and all the shares may also be replicated for fault-tolerance as any other data object stored within local storage 399 would be similarly replicated.

In this manner, the bit sequences Sj are the "secret shares" for an associated data object that are stored and must be combined to reconstitute the encryption key. Because the shares Sj are stored independently on different peer nodes 102, it is essentially impossible for a single malicious node acting alone to reconstitute the key.

FIG. 6B is a flowchart illustrating the receipt and subsequent decryption of a data object. Initially, peer node 102A obtains a copy of $O_{master}$ from another peer node storing the data object, extracts $O_{crypt}$, $S_{XOR}$, and the addresses of the secret share data objects used to store the encryption key (621). Peer node 102B next requests copies of each of the $S_j$ shares (622). Upon receiving the shares, peer node 102A performs an XOR of the secret shares and $S_{XOR}$ to reconstruct the encryption key K (623). Using encryption key K, peer node 102A decrypts $O_{crypt}$ locally, and recovers a plain text version of the retrieved data object O (624).

In accordance with the principles described herein, other secret sharing schemes may be used, such as those described in Blakley, G. R. "*Safeguarding Cryptographic Secrets*," in AFIPS 1979 NCC, 1979. Arlington Va. and in Shamir, A., "*How to Share a Secret*," Communications of the ACM, 1979, vol. 22: p. 612-613, herein incorporated by reference.

Figure 7:
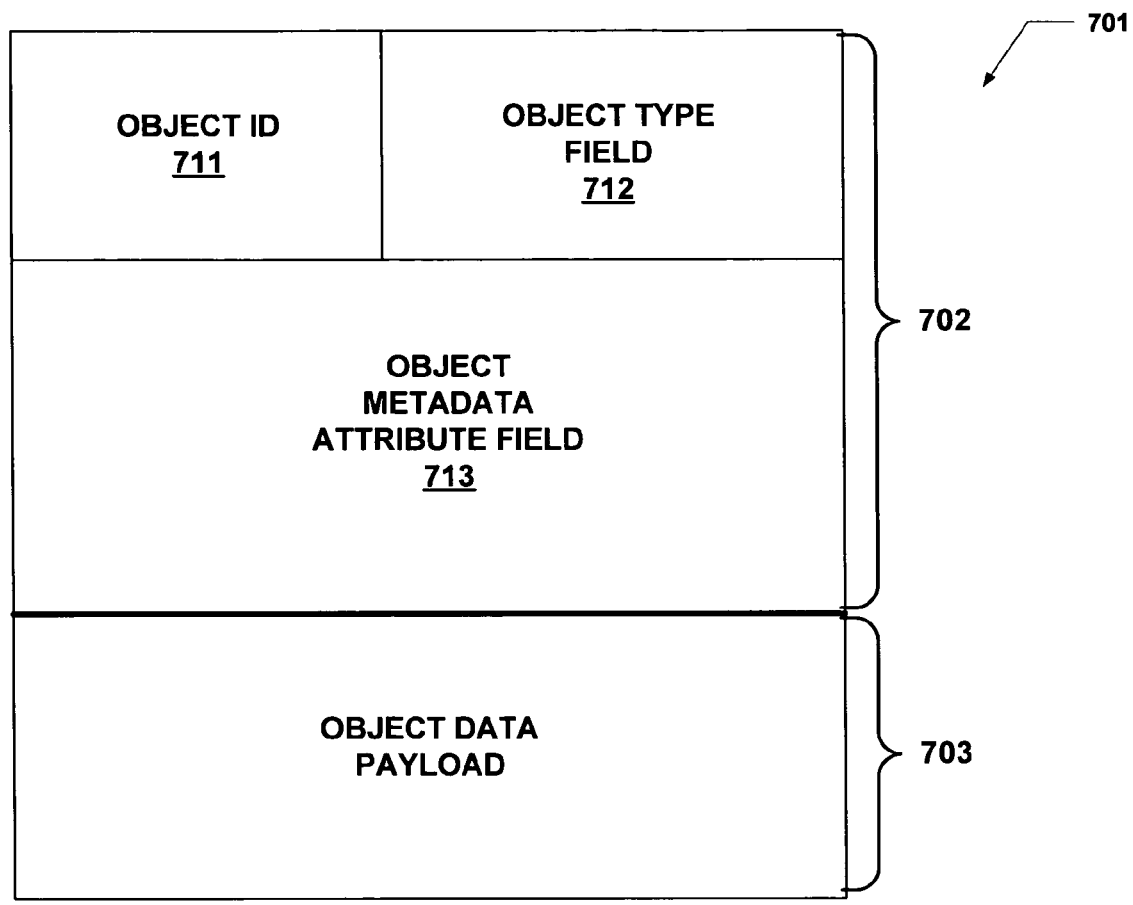
FIG. 7 is a block diagram illustrating an example embodiment of a data object stored by the P2P data storage system.

FIG. 7 is a block diagram illustrating an example embodiment of a data object for use within P2P data storage system 100. In the illustrated embodiment, data object 701 has a metadata block 702 and an object data payload 703. The object data payload 703 contains data associated with data object 701 for use when data object 701 is accessed.

Metadata block 702 contains an object ID field 711, an object type field 712, and at least one object metadata attribute field 713. Object ID field 711 contains the object ID for data object 701. This object ID corresponds to the object ID used when storing and accessing the data object from a local storage area 103A.

Object type field 712 contains data used to identify a type of data object. Data objects stored within local storage area 103A may be identified by one of a plurality of data types. Data objects of a common object type possess a common set of object metadata attributes stored within object metadata attribute field 713.

For example, a set of object metadata attributes stored within object metadata attribute field 713 may include identity of an author of data object, date of creation of data object 701, data of last modification of data object 701, and keyword description data used to describe the contents of data object 701. In an exemplary embodiment, metadata is stored, and subsequently searched, as a set of metadata attribute-attribute value pairs. Metadata values stored within object attribute field 713 correspond to the attribute value item of the pair. The metadata attribute of the attribute-value pair is specified when a type of data object metadata identified in object type field 712 is defined. The set of object metadata attributes may be used to search local storage area 103A to locate data objects meeting defined search criteria. In this manner, the object metadata attributes provide a mechanism for peer nodes 102 to determine object IDs corresponding to data objects of interest. Once the object IDs for these data objects are known, the data objects of interest may be retrieved and used using the techniques described above. In one embodiment, the object metadata attributes may be stored within a database for efficient searching using any well-known data query language.

In alternate embodiments, searchable attributes and their corresponding attribute values may be specified as a hierarchical data structure using XML or similar mark-up languages. In these alternate embodiments, the attribute values may be determined and corresponding data objects possessing metadata values satisfying a request query identified using well-known searching techniques corresponding to the storage and specification of the metadata. These alternate metadata specification and storage mechanisms may be used without departing from the present invention.

Figure 8:
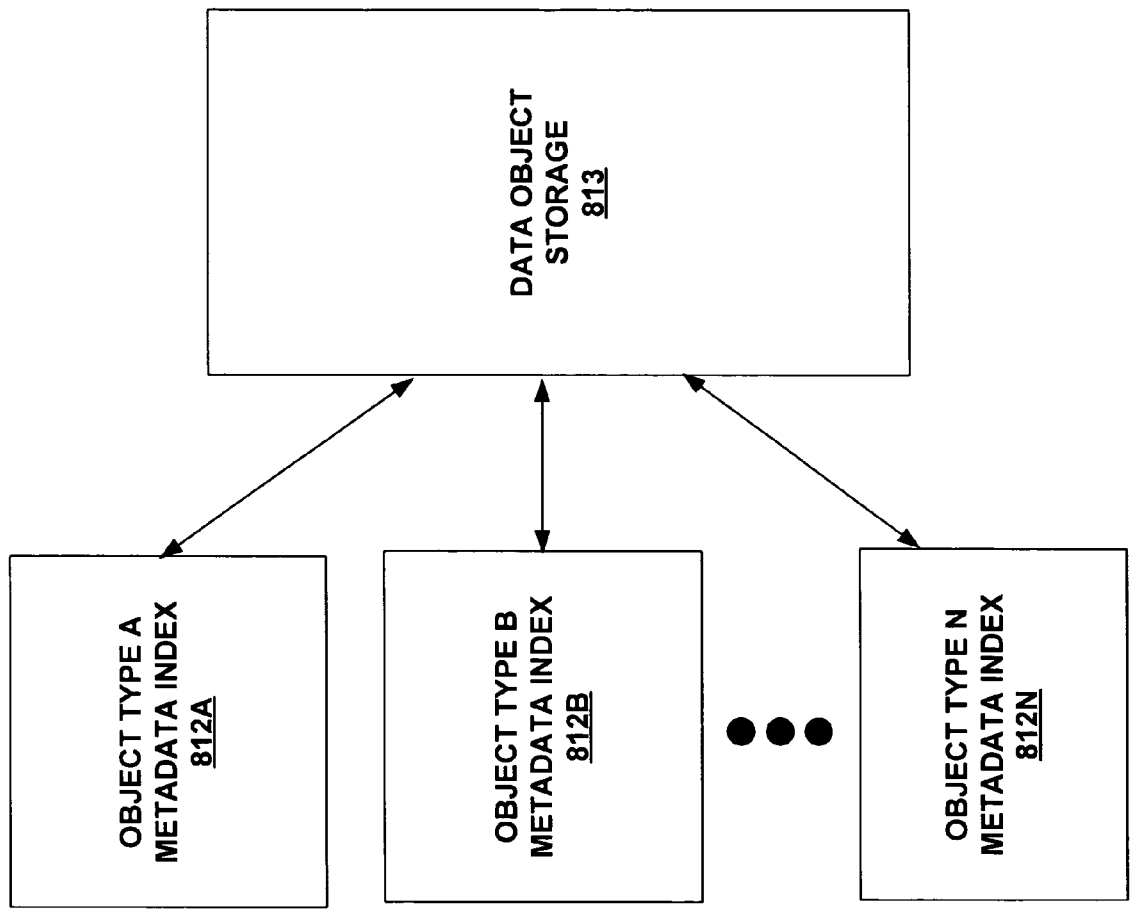
FIG. 8 is a block diagram illustrating an exemplary organization of data object database for use by a peer node of the P2P data storage system according to the present invention.

FIG. 8 is a block diagram illustrating an example scheme for metadata indexes for use by peer nodes 102 within P2P data storage system 100. In the illustrated example, each metadata indexes 812 stores object metadata attributes for a different object type. In other words, each metadata index 812 corresponds to different object type, and each metadata index may be replicated on two or more peer nodes 102. Metadata indexes 812 may, for example, be stored within a relational database. Data objects are stored within data object storage 813, e.g., as files on a local storage.

Client modules executing on peer nodes 102 issue metadata queries to identify data objects matching a particular search query. As a result, metadata indexes 812A-812N permit efficient identification of data objects matching a particular search query. Results from the particular search query include a set of object IDs corresponding to the data objects that satisfy the search query. Using this set of object IDs, peer nodes 102 may retrieve any or all of the data objects. Peer nodes 102 updates object type metadata indexes 812A-812N when data objects are created, modified or deleted.

Various embodiments of the invention have been described. These and other embodiments are within the scope of the following claims.

The invention claimed is:

1. A distributed data storage system comprising:
a plurality of peer nodes coupled by a communications network to form a peer-to-peer computing network; and a plurality of storage areas that stores data objects, each of the plurality of storage areas being locally coupled to a corresponding different one of the plurality of peer nodes, wherein each of the plurality of peer nodes includes one or more metadata indexes that store metadata associated with the data objects, a query processing module that processes queries from the other peer nodes and identifies one or more of the data objects based on metadata constraints specified within the queries, and an access control module that controls access to one or more of the data objects that are stored in the storage area coupled to the respective peer node, wherein the peer nodes store an encryption key within the storage areas by dividing the encryption key into a plurality of bit sequences after the encryption key has been used to encrypt a data object to create an encrypted data object, and by storing a different one of each of the plurality of bit sequences independently as a separate data object within a different one of the plurality of storage areas, each bit sequence having a unique identifier that is associated with a different one of the plurality of peer nodes, wherein a first one of the plurality of peer nodes attempts to subsequently reconstruct the encryption key from the plurality of bit sequences by obtaining the unique identifier of each bit sequence, identifying which of the plurality peer nodes are associated with the unique identifiers of the plurality of bit sequences, and requesting a copy of each bit sequence from a different one of the identified peer nodes that are each coupled to a different one of the plurality of storage areas, such that the reconstructed encryption key may be used to decrypt the encrypted data object, and wherein each of the identified peer nodes provides a copy of the requested bit sequence responsive to determining, using its respective access control module, whether the first one of the plurality of peer nodes is authorized to access the requested bit sequence stored in the storage area coupled to the respective identified peer node.

2. The distributed data storage system according to claim 1, wherein the peer nodes store each of the data objects in one of a plurality of formats in accordance with a security level associated with each of the data objects.

3. The distributed data storage system according to claim 1, wherein one or more of the data objects are stored within the plurality of storage areas as plain text data objects.

4. The distributed data storage system according to claim 1, wherein one or more of the data objects are stored within the plurality of storage areas as encrypted data objects.

5. The distributed data storage system according to claim 1, wherein each of the data objects is stored using a respective unique object identifier (ID).

6. The distributed data storage system according to claim 5, wherein the unique object ID corresponds to a hash of contents of the data object.

7. The distributed data storage system according to claim 5, wherein each of the data objects is stored within one or more of the peer nodes having a peer-to-peer address that is closest to the unique object ID for the data object.

8. The distributed data storage system according to claim 1, wherein the communication network comprises an IP-based network, and the peer-to-peer computing network is an overlay network on the IP-based network.

9. The distributed data storage system according to claim 1, wherein each unique identifier is computed based on a content of the corresponding bit sequence.

10. A system comprising:
a communications network;
a plurality of peer nodes coupled by the communications network to form a peer-to-peer network; and
a plurality of storage areas, each of the plurality of storage areas being locally coupled to a corresponding different one of the plurality of peer nodes,
wherein each of the peer nodes includes an encryption module,
wherein a first one of the peer nodes generates a data object and invokes the encryption module to generate an encrypted data object using an encryption key prior to transmitting the encrypted data object to a second one of the peer nodes for storage in one of the storage areas,
wherein the encryption key is divided into multiple bit sequences after being used to generate the encrypted data object,
wherein a different one of each of the multiple bit sequences is stored independently as a separate data object within a different one of the plurality of storage areas, each bit sequence having a unique identifier that is associated with a different one of the plurality of peer nodes,
wherein one of the plurality of peer nodes attempts to reconstruct the encryption key from the bit sequences by obtaining the unique identifier of each bit sequences sequence, identifying which of the plurality of peer nodes are associated with the unique identifiers of the bit sequences, and requesting a copy of each bit sequence from a different one of the identified peer nodes that are each coupled to a different one of the plurality of storage areas, such that the reconstructed encryption key may be used to decrypt the encrypted data object, and
wherein each of the identified peer nodes provides a copy of the requested bit sequence responsive to determining whether the one of the plurality of peer nodes is authorized to access the requested bit sequence stored in the storage area coupled to the respective identified peer node.

11. The system according to claim 10, wherein the encryption module of the first peer node decrypts the encrypted data object for use within the first peer node after retrieval from the second peer node.

12. The system according to claim 10, wherein the first peer node stores a master encrypted data object within the peer-to-peer communication network, wherein the master encrypted data object includes the encrypted data object and a corresponding intermediate bit sequence produced from the encryption key and from the multiple bit sequences, and wherein the master encrypted data object further includes the unique identifier of each bit sequence.

13. The system according to claim 10, wherein the encrypted data object is stored using a unique object identifier (ID).

14. The system according to claim 13, wherein the unique object ID corresponds to a hash of data object contents.

15. The system according to claim 13, wherein the encrypted data object is stored within one or more peer nodes having a P2P address closest to the unique object ID.

16. A method comprising:
receiving a query from a first peer node of a peer-to-peer (P2P) computer network requesting an identity of a data object associated with a metadata constraint specified in the query, wherein the data object does not comprise a key used for encryption or decryption;

determining, with a second peer node of the P2P computer network, that the first peer node is authorized to retrieve the data object;

upon determining that the first peer node is authorized to retrieve the data object, determining, with the second peer node, a unique object identifier of the data object associated with the metadata constraint by accessing one or more metadata indexes, wherein each of the one or more metadata indexes contains a set of metadata attributes of a different object type; and retrieving, with a third peer node of the P2P computer network, the data object corresponding to the determined unique object identifier;

requesting and receiving, by the third peer node, a copy of each of multiple bit sequences from a different one of identified peer nodes in the P2P computer network that are each coupled to a different one of a plurality of storage areas, wherein each of the identified peer nodes provides a copy of the requested bit sequence responsive to determining that the third peer node is authorized to access the requested bit sequence stored in the storage area locally coupled to the respective identified peer node;

reconstructing an encryption key from the received multiple bit sequences; and using the reconstructed encryption key to decrypt the data object, wherein at least one of the second peer node and the third peer node comprises a computer.

17. The method according to claim 16, wherein determining with a second peer node comprises:

processing the query within a query processing module to compare the metadata constraint against a metadata index in the one or more metadata indexes; and selecting the object identifier from the metadata index based on the metadata constraint.

18. The method according to claim 17, wherein metadata entries for the metadata index correspond to at least one metadata attribute-value pair.

19. The method according to claim 18, wherein the metadata entries correspond to hierarchical metadata specified in a mark-up language.

20. The method according to claim 19, wherein the mark-up language is XML.

21. The method according to claim 16,
wherein the data object includes a data object payload, and
wherein the object identifier includes:
an object ID field;
an object type field; and
a plurality of metadata attribute fields.

22. The method according to claim 21, wherein the data object payload comprises plain text data.

23. The method according to claim 21, wherein the data object payload comprises encrypted data.

24. The method according to claim 21, wherein the data object payload comprises secret share component data.

25. The method according to claim 16, wherein the second peer node and the third peer node are the same peer nodes.

26. The method according to claim 16, wherein the second peer node and the third peer node are different peer nodes.

27. A method comprising:
obtaining, by a first peer node comprising a computer, an encrypted data object, wherein the first peer node is included within a plurality of peer nodes that are coupled by a communications network to form a peer-to-peer computer network, and wherein each of a plurality of storage areas is locally coupled to a corresponding different one of the plurality of peer nodes;

obtaining, by the first peer node, a unique address of each of a different one of multiple bit sequences, wherein each of the multiple bit sequences is stored independently within a different one of the plurality of storage areas;

identifying, by the first peer node, which of the plurality of peer nodes are associated with the unique addresses of the multiple bit sequences;

requesting and receiving a copy of each of the multiple bit sequences from a different one of the identified peer nodes that are each coupled to a different one of the plurality of storage areas, wherein each of the identified peer nodes provides a copy of the requested bit sequence responsive to determining that the first peer node is authorized to access the requested bit sequence stored in the storage area locally coupled to the respective identified peer node;

reconstructing, by the first peer node, an encryption key from the received multiple bit sequences, wherein the encryption key was previously used to generate the encrypted data object; and using, by the first peer node, the reconstructed encryption key to decrypt the encrypted data object.

28. The method of claim 27, further comprising:
generating the encrypted data object using the encryption key;

transmitting the encrypted data object to one of the peer nodes in the peer-to-peer computer network;

dividing the encryption key into the multiple bit sequences after the encryption key has been used to generate the encrypted data object; and storing a different one of each of the multiple bit sequences independently within a different one of the plurality of storage areas.

29. A computer-readable storage medium comprising instructions that, when executed, cause one or more peer nodes to:

obtain an encrypted data object, wherein the first peer node is included within a plurality of peer nodes that are coupled by a communications network to form a peer-to-peer computer network, and wherein each of a plurality of storage areas is locally coupled to a corresponding different one of the plurality of peer nodes;

obtain a unique address of each of a different one of multiple bit sequences, wherein each of the multiple bit sequences is stored independently within a different one of the plurality of storage areas;

identify which of the plurality of peer nodes are associated with the unique addresses of the multiple bit sequences;

request and receiving a copy of each of the multiple bit sequences from a different one of the identified peer nodes that are each coupled to a different one of the plurality of storage areas, wherein each of the identified peer nodes provides a copy of the requested bit sequence responsive to determining that the one or more peer nodes are authorized to access the requested bit sequence stored in the storage area locally coupled to the respective identified peer node;

reconstructing an encryption key from the received multiple bit sequences, wherein the encryption key was previously used to generate the encrypted data object; and using the reconstructed encryption key to decrypt the encrypted data object.

* * * * *